United States Patent
Tomiyama et al.

(10) Patent No.: US 7,662,329 B2
(45) Date of Patent: Feb. 16, 2010

(54) CENTRIFUGAL CASTING DIE, METHOD FOR MANUFACTURING THEREOF AS WELL AS CASTING MATERIAL, BLADE OBTAINED THEREFROM AND METHOD FOR MANUFACTURING THEREOF

(75) Inventors: Takashi Tomiyama, Ibaraki (JP); Hisao Kumano, Ibaraki (JP); Koichi Sato, Tokyo (JP); Taku Hatanaka, Ibaraki (JP)

(73) Assignee: Canon Kasei Kabushiki Kaisha, Tsukuba (JP)

( * ) Notice: Subject to any disclaimer, the term of this patent is extended or adjusted under 35 U.S.C. 154(b) by 14 days.

(21) Appl. No.: 10/427,935

(22) Filed: May 2, 2003

(65) Prior Publication Data

US 2003/0231908 A1 Dec. 18, 2003

(30) Foreign Application Priority Data

| May 10, 2002 | (JP) | 2002-136190 |
| May 10, 2002 | (JP) | 2002-136191 |
| Apr. 22, 2003 | (JP) | 2003-117441 |

(51) Int. Cl.
B28B 1/20 (2006.01)
B28B 7/08 (2006.01)

(52) U.S. Cl. .......... 264/310; 264/157; 264/225

(58) Field of Classification Search ......... 264/219–221, 264/225–226, 255, 310–311, 146, 157, 158–160; 425/471
See application file for complete search history.

(56) References Cited

U.S. PATENT DOCUMENTS

| 2,488,446 | A | | 11/1949 | Swiss |
| 3,419,455 | A | * | 12/1968 | Roberts ............... 428/36.5 |
| 3,625,469 | A | | 12/1971 | Nitta et al. |
| 3,925,530 | A | | 12/1975 | Rees |
| 3,979,543 | A | | 9/1976 | Higbee |
| 4,070,286 | A | * | 1/1978 | Iler et al. ............ 210/656 |
| 4,255,044 | A | * | 3/1981 | Cormier et al. ...... 399/348 |
| 4,285,903 | A | * | 8/1981 | Lemelson ............ 264/310 |
| 4,394,340 | A | * | 7/1983 | Tarumi et al. ........ 264/219 |
| 4,990,292 | A | * | 2/1991 | Hattori et al. ........ 264/426 |

(Continued)

FOREIGN PATENT DOCUMENTS

JP  58-36981  *  3/1983

(Continued)

*Primary Examiner*—Matthew J. Daniels
(74) *Attorney, Agent, or Firm*—Fitzpatrick, Cella, Harper & Scinto (57) ABSTRACT

A method for manufacturing a centrifugal casting die includes the steps of supplying a first liquid agent for forming a backup layer to be releasably bonded to an inner surface of a cylindrical die, rotating the die body so that the first liquid agent is uniformly spread over the entirety of the inner surface of the die body, and curing the first liquid agent spread over the entirety of the inner surface of the die body to form the backup layer. A second liquid agent is applied to be bonded to be integral with an inner surface of the backup layer to form a top layer. Then the die body is rotated so that the second liquid agent is uniformly spread over the entirety of the inner surface of the backup layer and cured to form the top layer. The top layer releasably holds a centrifugally casting material supplied to the inner surface thereof.

10 Claims, 8 Drawing Sheets

U.S. PATENT DOCUMENTS

| | | | | |
|---|---|---|---|---|
| 5,310,095 | A | * | 5/1994 | Stern et al. ............... 222/402.1 |
| 5,536,352 | A | * | 7/1996 | Zeman et al. ............... 156/242 |
| 5,776,395 | A | * | 7/1998 | Fujiwara et al. ............. 264/146 |
| 6,068,801 | A | | 5/2000 | Bodo et al. |
| 6,336,025 | B1 | * | 1/2002 | Saeki ......................... 399/301 |
| 6,500,367 | B2 | * | 12/2002 | Naus et al. .................... 264/39 |
| 6,699,419 | B1 | * | 3/2004 | Kia et al. .................... 264/219 |
| 2002/0084547 | A1 | * | 4/2002 | Naus et al. .................. 264/104 |

FOREIGN PATENT DOCUMENTS

| | | | |
|---|---|---|---|
| JP | 61-044625 | * | 3/1986 |
| JP | 5-245848 A | | 9/1993 |
| JP | 07-306616 | | 11/1995 |
| JP | 11-198158 | | 7/1999 |
| JP | 2000-172068 | | 6/2000 |
| JP | 2001-305858 | * | 11/2001 |
| JP | 2002-178345 | * | 6/2002 |

\* cited by examiner

CENTRIFUGAL CASTING DIE, METHOD FOR MANUFACTURING THEREOF AS WELL AS CASTING MATERIAL, BLADE OBTAINED THEREFROM AND METHOD FOR MANUFACTURING THEREOF

This application claims priority from Japanese Patent Application Nos. 2002-136191 filed May 10, 2002, 2002-136190 filed May 10, 2002 and 2003-117441 filed Apr. 22, 2003, which are incorporated hereinto by reference.

BACKGROUND OF THE INVENTION

1. Field of the Invention

The present invention relates to a centrifugal casting die for casting a thin-walled cylindrical resinous material and a method for manufacturing the casting die as well as the casting material by using the same, a blade used in an electrophotographic apparatus and a method for manufacturing the blade.

2. Description of the Related Art

Figure 7:
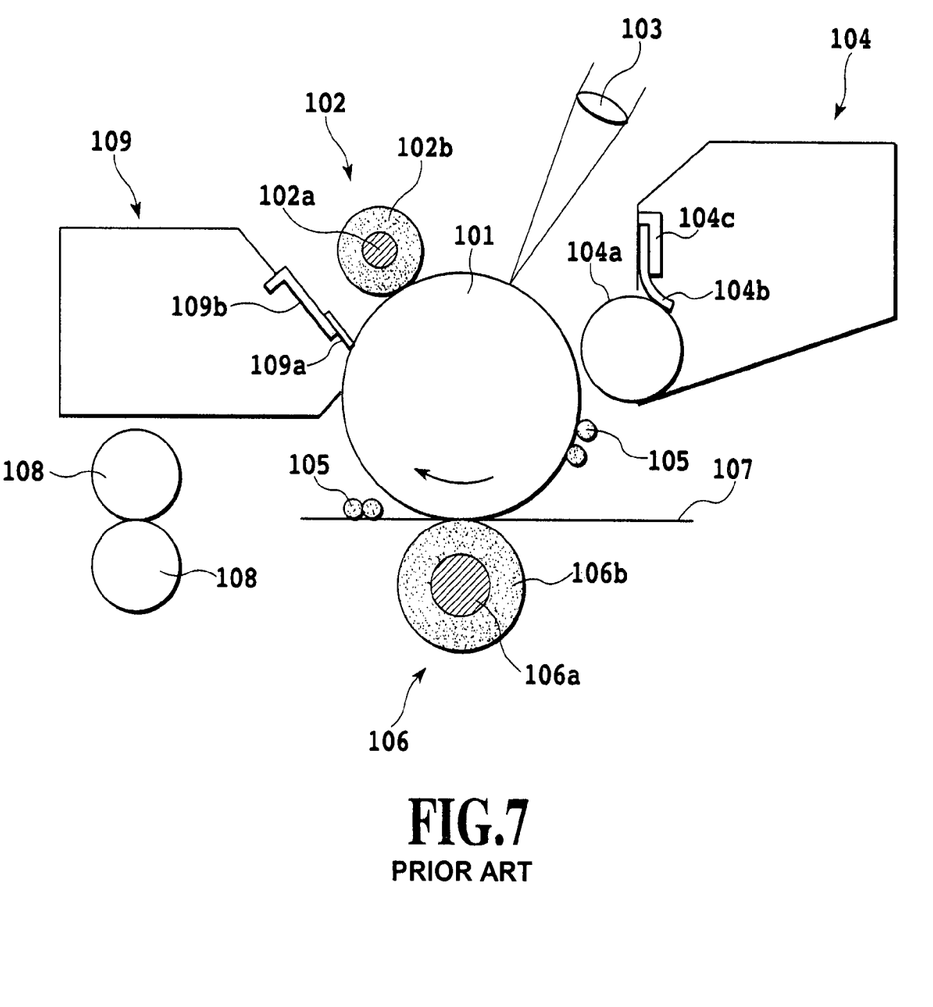
FIG. 7 is a schematic illustration of one example of the electrophotographic apparatus.

A schematic structure of a conventional electrophotographic apparatus is shown in FIG. 7, which carries out a contact-charging process and a contact-transfer process without using a corona discharge. That is, an electro-photosensitive drum 101 on which an electrostatic latent image is formed is provided with an electroconductive basic layer made, for example, of aluminum and a photoelectric-conductive layer formed on the outer surface of this electroconductive basic layer. A charging roller 102 which is in contact with the outer surface of the electro-photosensitive drum 101 and uniformly charges the latter at a predetermined electric potential level is provided with a core spindle 102a and an electroconductive elastic layer 102b encircling the core spindle 102a. This charging roller 102 is pressed upon the outer surface of the electro-photosensitive drum 101 by biasing means such as a spring (not shown), and is made to passively rotate as the electro-photosensitive drum 101 is driven. By applying a bias voltage which is a direct current integrant added with an alternate current integrant, or solely a direct current integrant to the core spindle 102a of the charging roller 102, the surface of the electro-photosensitive drum 102 is contact-charged to a predetermined electric potential level. By exposing the surface of the electro-photosensitive drum 101 charged at the predetermined electric potential level as describe above with image information via a focusing lens 103 of an exposure device using a laser or LED, a static latent image is formed on the surface of the electro-photosensitive drum 101 in correspondence to this image information, and is visualized as a toner image by a toner 105 supplied via a developer sleeve 104a of a developing device 104. A developer blade 104b is brought into slide-contact with the outer periphery of the developer sleeve 104a, for properly restricting an amount of the toner 105 to electro-photosensitive drum 101. A transfer roller 106 having a core spindle 106a supported at opposite ends to be rotatable and a cylindrical electroconductive elastic layer 106b encircling the core spindle 106a charges the toner image formed on the surface of the electro-photosensitive drum 101 from a back surface of a transfer medium 107 such as paper to have a polarity reverse to that of the toner 105, whereby the toner image on the electro-photosensitive drum 101 is transferred to the surface of the transfer medium 107. The transfer medium 107 on which the toner image is transferred is separated from the electro-photosensitive drum 101 and nipped between a pair of fixing rollers 108 whereby the toner image is fixed to the transfer medium 107 by heat and pressure. Residual toner left on the electro-photosensitive drum 101 is wiped off therefrom by a cleaning blade 109a in a cleaner 109. Thus, the surface of the electro-photosensitive drum 101 is cleaned.

Various blade members used in such an electrophotographic apparatus, for example, the above-mentioned developer blade 104b for properly restricting an amount of toner 105 carried on the outer periphery of the developer sleeve 104a or the cleaning blade 109a for wiping off the residual toner 105 from the surface of the electro-photosensitive drum 101 are manufactured by casting thermosetting resin excellent in resistance to abrasion or in mechanical properties such as urethane rubber into the interior of a cylindrical die for a centrifugal casting rotating at a high speed so that the resin is spread over the inner surface of the casting die to form a thin layer which is then heated to be a cylindrical sheet material (in a case of the developer blade 104b, the thickness is in a range from 0.5 to 2 mm, while in a case of the cleaning blade 109a, from 1.5 to 3 mm), and after removing the cylindrical sheet material from the casting die, cutting the same to be pieces having a predetermined size and shape which pieces are adhered to a metallic mounting member 104c or 109b via an adhesive.

Figure 8:
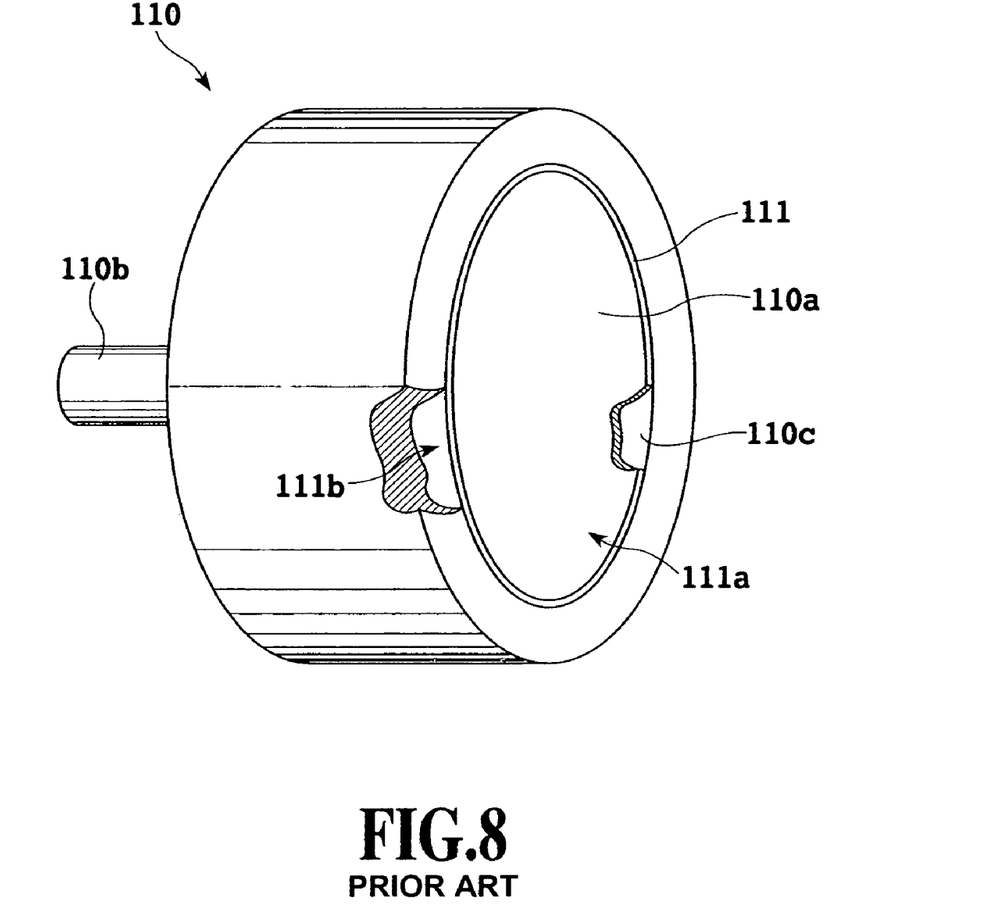
FIG. 8 is a perspective view for schematically illustrating the appearance of the conventional centrifugally casting die.

An appearance of the conventional die for a centrifugal casting to obtain such a thin-walled resinous cylindrical material is schematically shown in FIG. 8 in a partly broken manner. That is, a cup-shaped die body 110 has an opening 110a at one end and a rotary shaft 110b at the other end which projects outward and is coupled to a drive source (not shown). A thermosetting resin to be fed to the inner surface 110c of the die body 110 via the opening 110a is uniformly spread all over the inner surface 110c by the rotation of the die body 110 driven by a drive source and hardened by receiving heat generated from a heater (not shown) embedded in the die body 110. A thin-walled centrifugal casting is released from the inner surface 110c, i.e., an inner wall, of the die body 110 after the rotation of the die body 110 has stopped, and cut into pieces of a predetermined size and shape, which are then used as the developer blade 104b or the cleaning blade 109a as described above.

In this regard, an inner surface 111a of the thin-walled resinous cylindrical material 111 is referred to as an air surface, while an outer surface 111b opposite thereto to be in contact with the inner wall 110c of the die body 110 is referred to as a casting surface. The air surface 111a is a mirror surface but the casting surface 111b has a surface roughness transferred from the inner wall 110c of the die body 110. Thus, when the thin-walled resinous cylindrical material 111 manufactured by the centrifugal casting is used as a developer blade 104b or a cleaning blade 109a, the air surface 111a generally excellent in smoothness is used as a surface to be in slide-contact with the developer sleeve 104a or the electro-photosensitive drum 101.

While the thin-walled resinous cylindrical material manufactured by the centrifugal casting can easily have a uniform thickness, the requirement for the further precision of the size and shape of the blade has recently been increased because the speed of an electrophotographic apparatus such as a printer or a copier has been more accelerated and the image quality thereof has become higher.

When a center axis of the rotary shaft 110b is eccentric from a center axis of the inner surface 110c of the conventional die body 110 shown in FIG. 8, or the deviation from circular form of the inner surface 110c of the die body 110 is low, vibration occurs in the inner surface 110c of the die body 110 during the rotation of the casting die, causing the uneven distribution of centrifugal force in the circumferential direction thereof and results in an inconvenience in that a wall thickness of the obtained thin-walled resinous cylindrical material 111 lacks the uniformity in the circumferential direction.

To solve such an inconvenience, a proposal is disclosed in Japanese Patent Application Laid-Open No. 2000-172068 in that resin for compensating for the eccentricity of the inner surface of the die body is supplied in advance to the inner surface of the die body and heat-set to form an eccentricity-compensation layer integral with the die body, after which resin for forming the thin-walled resinous cylindrical material is supplied to the inner surface of the eccentricity-compensation layer. According to this method, since the eccentricity of the rotary axis of the inner surface of the eccentricity-compensation layer is automatically corrected relative to the center of the rotary shaft of the die body during the casting process, it is possible to almost eliminate the variation of the circumferential directional-wall thickness of the thin-walled resinous cylindrical material cast on the inner surface of the eccentricity-compensation layer. In addition, since the inner surface of the eccentricity-compensation layer becomes a mirror surface without the mirror finishing, it is possible to finish the casting surface of the thin-walled resinous cylindrical material thus obtained as a mirror surface similar to the air surface thereof. Particularly, when the silicone rubber is used as the eccentricity-compensation layer, the thin-walled resinous cylindrical material is easily released from the eccentricity-compensation layer without coating a die-lubricant on the inner surface of the eccentricity-compensation layer, whereby it is possible to reduce the man-hour or the production cost for the rinsing process or others due to the elimination of the die-lubricant.

When the casting of the thin-walled resinous cylindrical material has been repeated by this method, however, the releasability of the inner surface is gradually lowered, which necessitates the removal of the eccentricity-compensation layer from the inner surface of the die body after the repetition of a certain number of casting cycles and then the formation of a fresh eccentricity-compensation layer. Particularly, when the silicone rubber having the deterioration in releasability is removed from the inner surface of the die body, the silicone rubber is liable to be torn and left on the inner surface. The complete removal thereof from the inner surface of the die body necessitates an extremely large amount of man-hours.

Also, according to the method disclosed in Japanese Patent Application Laid-Open Nos. 2000-172068 and 2001-305858, since the inner surface of the eccentricity-compensation layer has a mirror surface even though the inner surface of the die body is not subjected to the mirror finishing, the casting surface of the resultant thin-walled resinous cylindrical material is finished as a mirror surface similar to the air surface thereof to increase the tackiness; i.e., stickiness. As a result, when the obtained thin-walled centrifugally casting material is processed to a blade or others of the electrophotographic apparatus, it is liable to adhere to a casting jig or others and difficult to be handled to lower the workability.

SUMMARY OF THE INVENTION

An object of the present invention is to provide a centrifugal casting die from which a centrifugally casting material is easily removable without using a die-lubricant, and which is capable of being repeatedly used and easily refreshed, as well as to provide a method for manufacturing such a casting die.

Another object of the present invention is to provide cylindrical centrifugally casting materials excellent in quality and having a uniform thickness manufactured by using such a centrifugal casting die, blades used in an electrophotographic apparatus and a method for manufacturing the blades.

A first aspect of the present invention is a centrifugal casting die comprising a cylindrical die body, a backup layer releasably bonded to the inner surface of the cylindrical die body, and a top layer bonded to be integral with the inner surface of the backup layer, wherein the top layer releasably holds a centrifugally casting material supplied to the inner surface thereof.

In the present invention, a centrifugally casting material is supplied to the inner surface of the top layer and the die body is driven to rotate so that the material uniformly spreads over the entirety of the inner surface of the top layer. After the centrifugally casting material has been hardened in this state, the cylindrical centrifugally casting material thus obtained is released from the top layer.

According to the first aspect of the present invention, since the backup layer is bonded to the inner surface of the cylindrical die body and the top layer is further bonded to the inner surface of this backup layer to form an integral body, it is possible to form the cylindrical centrifugally casting material having a uniform thickness on the inner surface of the top layer, which is easily and assuredly released from the top layer.

In the first aspect of the centrifugal casting die according to the present invention, the backup layer is preferably formed of a thermosetting resin having a heat-durable temperature not lower than a curing temperature of the centrifugally casting material, generally at approximately 150° C. Particularly, if the material does not exhibit a rubber-like elasticity in a temperature range from a room temperature to 150° C., it is advantageous when the backup layer is released from the die body together with the top layer. Such a thermosetting resin includes, for example, polyimide resin, polyurethane resin, phenolic resin and epoxy resin. Especially, epoxy resin is preferable because it is possible to maintain a proper contact with the inner surface of the die body. The backup layer should not be limited to the above-mentioned thermosetting resins but includes a solvent-soluble type resin which is in a liquid form prior to the curing and is in a solid form when cured. Such a solvent-soluble type resin includes, for example, polystyrene, polyamide and polycarbonate.

The backup layer preferably has a thickness in a range from 0.5 to 5.0 mm. If the thickness of the backup layer is less than 0.5 mm, the strength of the backup layer becomes insufficient whereby the difficulty occurs when the backup layer is removed from the die body together with the top layer. On the contrary, if the thickness exceeds 5 mm, the effect of heat conduction from the die body through the centrifugally casting material is lowered to disturb the smooth curing of the centrifugally casting material, which causes a risk of adverse effect to the physical properties thereof. In such a manner, by maintaining the thickness of the backup layer in a range from 0.5 to 5.0 mm, it is possible to restrict the thermal deterioration of the backup layer when the centrifugally casting material is heated and hardened. In addition, it is possible to smoothly heat the centrifugally casting material while ensuring the strength of the backup layer itself.

Material for forming the top layer is not particularly limited provided it has a releasability to the centrifugally casting material and is in a liquid form when the top layer is formed, such as resin or rubber soluble in solvent or water. However, thermosetting resin is favorable, which is usable without solvent or others and heat-resistant durable at a temperature of 150° C. or higher because such resin easily makes the inner surface to be a mirror surface during the manufacturing of the top layer. Examples of such thermosetting resin are fluorine resin, silicone resin and silicone rubber. Particularly, although the silicone rubber may be either a one-pack type or a two-pack type using a curing agent, a so-called LTV (low temperature vulcanizing) type of RTV (room temperature vulcanizing) type is favorable, which is curable at a temperature of 150° C. or lower.

The top layer may contain a powdery surface-roughening agent having a resistance to heat of approximately 150° C. for roughening the inner surface of the top layer. The surface-roughening agent may include a solid lubricant such as a silicone type lubricant, a fluorine type lubricant, molybdenum disulfide, graphite, graphite fluoride, boron nitride, tungsten disulfide, talc or others. Particularly, in view of various workability requirements, graphite fluoride having a particle size of 10 μm or less is preferable, A particle size of 5 μm or less is more preferable. If the particle size exceeds 10 μm, an adverse effect may occur as to thickness of the resultant centrifugally casting material. Further, the ten-point average surface roughness Rz of the inner surface of the top layer is preferably in a range from 2 to 10 μm. By roughening the inner surface of the top layer in such a manner, it is possible to easily release the centrifugally casting material formed on the inner surface of the top layer from the top layer, as well as minimize the tackiness by roughening the casting surface.

A second aspect of the present invention is a method for manufacturing a centrifugal casting die comprising the steps of supplying a first liquid agent for forming a backup layer to be releasably bonded to the inner surface of the cylindrical die body, rotating the die body so that the first liquid agent is uniformly spread over the entirety of the inner surface of the die body, curing the first liquid agent spread over the entirety of the inner surface of the die body to form the backup layer, supplying a second liquid agent to be bonded to be integral with the inner surface of the backup layer to form a top layer, rotating the die body so that the second liquid agent is uniformly spread over the entirety of the inner surface of the backup layer, and curing the second liquid agent spread over the entirety of the inner surface of the die body to form the top layer.

According to the second aspect of the present invention, since the backup layer bonded to the inner surface of the cylindrical die body is formed in a releasable manner and the top layer is bonded to be integral with the inner surface of the backup layer, it is possible to form a cylindrical centrifugally casting material having a uniform thickness on the inner surface of the top layer, which is easily and assuredly released from the top layer.

In the method for manufacturing the centrifugal casting die according to a second aspect of the present invention, since it is difficult to form the backup layer having a uniform thickness if the viscosity of the first liquid agent forming the backup layer is excessively high, the viscosity of the first liquid agent is 2 Pa·s or lower, preferably 1 Pa·s or lower.

To properly adjust the bonding state of the backup layer relative to the inner surface of the die body, it is effective to coat the inner surface of the die body with a small amount of die-lubricant prior to supplying the first liquid agent to the inner surface of the die body. Examples of such a die-lubricant are a silicone type die lubricant, a fluorine type die-lubricant, wax, or a solution in which a resin soluble in a solvent, such as fluorine resin or polyacetal, is dissolved in the solvent at several percent.

In a similar manner as in the backup layer described above, since it is difficult to form the top layer having a uniform thickness by the centrifugal casting if the viscosity of the second liquid agent forming the top layer is excessively high, the viscosity of the second liquid agent is also 2 Pa·s or lower, preferably 1 Pa·s or lower.

The step for forming the top layer may include further spraying the second liquid agent containing a surface-roughening agent prior to the complete hardening of the second liquid agent spread over the entirety of the inner surface of the die body to roughen the inner surface of the top layer. In this case, it is possible to form a centrifugally casting material in which the casting surface is roughened to have a less tackiness. That is, an object for adding the surface-roughening agent for forming the top layer together with the second liquid agent is to mitigate the tackiness of the casting surface of the obtained centrifugally casting material by roughening the inner surface of the top layer. This surface-roughening agent may be of a powdery form having the resistance to heat at a temperature of approximately 150° C. Particularly, when the solid type lubricant is used, it is possible to further reduce the tackiness of the casting surface in the resultant centrifugally casting material.

When the surface-roughening agent is spread together with the second liquid agent, it is effective to also use a relatively high-volatile solvent for uniformly spreading the surface-roughening agent in the second liquid agent and not left in the top layer after the casting, such as toluene or hexane.

When the silicone rubber is used as the top layer, the removal of the centrifugally casting material becomes gradually difficult because the releasability thereof is lowered as the casting operation is repeated. To solve this problem, a fresh top layer may be provided on the inner surface of the old top layer to ensure the releasability for the centrifugally casting material.

A thickness of a single top layer is approximately in a range from 0.3 to 3 mm, preferably from 0.3 to 1 mm. If the thickness of the top layer is less than 0.3 mm, it is difficult to form the top layer of uniform thickness on the backup layer, while if exceeding 3 mm, there is a risk of ply separation because of the deterioration of the adhesive properties of the individual top layers when a plurality of top layers are piled together. Also, when a plurality of top layers are piled together, a total thickness thereof is approximately in a range from 3 to 20 mm, preferably less than 5 mm. If the total thickness of the top layers exceeds 20 mm, the heat conduction from the die body via the backup layer and the top layer to the centrifugally casting material is lowered to disturb the smooth curing of the centrifugally casting material, which results in the adverse effect on the physical properties of the material.

When a plurality of top layers are sequentially piled for the purpose of ensuring the releasability of the top layer and a total thickness thereof becomes large enough to adversely effect on the physical properties of the resultant centrifugally casting material, it is advantageous to remove the old top layers from the die body together with the backup layer and freshly form a backup layer and a top layer. That is, since the adhesivity between the inner surface of the die body and the backup layer is moderate, while that between the backup layer and the top layer and that between the top layers adjacent to each other are firmer than the former, it is relatively easy to remove the backup layer and the top layers from the die body. Concretely, the step further comprises cooling the die body to release the backup layer and the top layers from the die body by using the difference in coefficient of thermal expansion between the die body and the backup layer, and sequentially forming a fresh backup layer and a fresh top layer on the inner surface of the die body. Since there is a large difference in the coefficient of thermal expansion between the die body and the backup layer (that is, that of the die body is approximately $10^{-5}$ and that of the backup layer is approximately $10^{-4}$), by the volume change of the backup layer caused by the cooling of the die body, the adhesivity of the die body to the backup layer is lowered and the backup layer is easily released from the die body together with the top layer. In such a manner, if there is a need for exchanging the top layer of the die body now in use due to the repetition of the centrifugal casting, the top layer is removed from the die body together with the backup layer and a fresh backup layer and top layer are formed again, whereby the die body is semipermanently usable while minimizing the lowering of the operating efficiency thereof.

A third aspect of the present invention is a cylindrical centrifugally casting material produced by using the centrifugal casting die according to the first aspect of the present invention, or by using the centrifugal casting die manufactured by the method according to the second aspect of the present invention.

According to the third aspect of the present invention, since a cylindrical centrifugally casting material is manufactured by using the centrifugal casting die, it is possible to effectively obtain a high quality material having a uniform thickness at a low production cost.

Material for forming the cylindrical centrifugally casting material according to a third aspect of the present invention includes, for example, polyurethane rubber and silicone rubber. When the material is used for a developer blade or a cleaning blade of an electrophotographic apparatus, the polyurethane rubber is favorable because it is small in permanent strain and excellent in resistance to abrasion. The polyurethane rubber is produced by the curing reaction of polyisocyanate compound, macromolecular polyol and a curing agent.

The above-mentioned polyisocyanate includes, for example, 4,4'-diphenylmethane diisocyanate (MDI), tolylene diisocyanate (TDI), 4,4'-dicyclohexyl methane diisocyanate (water-added MDI), carbodiimide modified MDI, 2,4-tolylene diisocyanate urethydindion (dimerized 2,4-TDI), polymethylene phenyl polyisocyanate (PAPI), xylene diisocyanate (XDI), trimethyl hexamethylene diisocyanate (TM-HDI), ortho-toluidine diisocyanate (TODI), naphthylene diisocyanate (NDI), para-phenylene diisocyanate (PDI) and lysine diisocyanate methyl ester (LDI). Each of them may be used alone or mixed with the other.

The above-mentioned macromolecular polyol includes, for example, polyester polyol and polyether polyol. The above polyester polyol includes, for example, polyethylene adipate, polybutylene adipate, polyhexylene adipate, copolymer of ethylene adipate and butylene adipate, and polycaprolactone. The polyether polyol includes, for example, polyoxytetramethylene glycol and polyoxypropylene glycol. Particularly, the molecular weight of them is preferably in a range from approximately 1500 to 3000. That is, if the molecular weight is less than 1500, the physical properties of the resultant urethane rubber are liable to degrade. On the other hand, if the molecular weight is 3000 or more, the viscosity of prepolymer becomes excessively high to significantly deteriorate the workability during the centrifugal casting.

The above-mentioned curing agent includes, for example, low-molecular dihydric alcohol having a molecular weight of 300 or less and polyhydric alcohol such as trihydric alcohol. The low-molecular dihydric alcohol includes, for example, ethylene glycol (EG), diethylene glycol (DEG), propylene glycol (PG), dipropylene glycol (DPG), 1,4-butane diol (1,4-BD), hexane diol and 1,4-hexane diol (HD). The polyhydric alcohol includes, for example, trifunctional aliphatic polyol such as glycerin, 1,2,4-butane triol, trimethylolethane, trimethylolpropane (TMP) or 1,2,6-hexanetriol. Further, polyether triol obtained by adding ethyleneoxide, propyleneoxide or butyleneoxide to the trifunctional aliphatic polyol, or polyester triol obtained by adding lacton to the trifunctional aliphatic polyol may be used. Each of them may be used alone or mixed with the other.

A fourth aspect of the present invention is a cleaning blade held by a mounting member via an adhesive to be brought into slide-contact with the outer surface of the photosensitive drum in an electrophotographic apparatus for wiping-off the outer surface of the photosensitive drum, wherein the cleaning blade is obtained by cutting the cylindrical centrifugally casting material according to the third aspect of the present invention in the circumferential direction into rectangular pieces.

A fifth aspect of the present invention is a developer blade held by a mounting member via an adhesive to be brought into slide-contact with the outer surface of a developer sleeve in an electrophotographic apparatus for restricting an amount of toner carried on the developer sleeve, wherein the developer blade is obtained by cutting the cylindrical centrifugally casting material according to the third aspect of the present invention in the circumferential direction into rectangular pieces.

According to the fourth or fifth aspect of the present invention, since the cleaning blade or the developer blade of the present invention is prepared by cutting the cylindrical centrifugally casting material manufactured by using the centrifugal casting die according to the present invention in the circumferential direction thereof into rectangular pieces, it is possible to effectively obtain a high-quality blade having a uniform thickness at a low production cost.

In the cleaning blade of a fourth aspect of the present invention or the developer blade of a fifth aspect of the present invention, the mounting member may be formed of metal, plastics or ceramics provided it has a predetermined mechanical strength. Particularly, steel plate subjected to a surface treatment, such as a phosphoric acid-zinc treatment or a chromate treatment, is preferably used because it is low in cost and difficult to corrode with time. While the blade may be adhered to the mounting member by an adhesive tape, an instant adhesive or a reactive adhesive (such as an ultraviolet-curing adhesive or a heat-hardening adhesive), a hot melting type adhesive is preferably used in view of the adhesive force and cost.

A sixth aspect of the present invention is a method for manufacturing a blade for an electrophotographic apparatus by using the centrifugal casting die according to the first aspect of the present invention, or by using a centrifugal casting die manufactured by the method according to the second aspect of the present invention, comprising the steps of supplying liquid material forming the blade for the electrophotographic apparatus to the inner surface of the top layer, rotating the die body to uniformly spread the liquid material over the entirety of the inner surface of the top layer, curing the liquid material spread over the entirety of the inner surface of the top layer to result in a cylindrical centrifugally casting material, stopping the rotation of the die body to remove the cured cylindrical centrifugally casting material therefrom, and cutting the cylindrical centrifugally casting material in the circumferential direction into rectangular pieces.

A seventh aspect of the present invention is a method for manufacturing a blade for an electrophotographic apparatus comprising a step of cutting the cylindrical centrifugally casting material according to the third aspect of the present invention in the circumferential direction into rectangular pieces.

According to the sixth or seventh aspect of the present invention, since the blade for the electrophotographic apparatus is prepared by cutting the cylindrical centrifugally casting material manufactured by using the centrifugal casting die according to the present invention in the circumferential direction thereof into rectangular pieces, it is possible to effectively obtain a high-quality blade having a uniform thickness at a low production cost.

In the method for manufacturing the blade for the electrophotographic apparatus according to the sixth or seventh aspect of the present invention, the blade for the electrophotographic apparatus may be a cleaning blade held by a mounting member via an adhesive to be brought into slide-contact with the outer surface of the photosensitive drum in the electrophotographic apparatus for wiping-off the outer surface of the photosensitive drum. Alternatively, the blade for the electrophotographic apparatus may be a developer blade held by a mounting member via an adhesive to be brought into slide-contact with the outer surface of a developer sleeve in the electrophotographic apparatus for restricting an amount of toner carried on the developer sleeve.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described in detail with reference to FIGS. 1 to 6, in which a centrifugal casting die according to the present invention is applied to the casting of a centrifugally casting material for producing a cleaning blade of an electrophotographic apparatus shown in FIG. 7. It is noted, however, that the present invention should not be limited to these embodiments, but includes all modifications and changes contained in a concept of the present invention defined by the scope of the appended claims for patent. Accordingly, the present invention is, of course, applicable to other technologies within the spirit thereof, for example, a developer blade of the above-mentioned electrophotographic apparatus.

Figure 1:
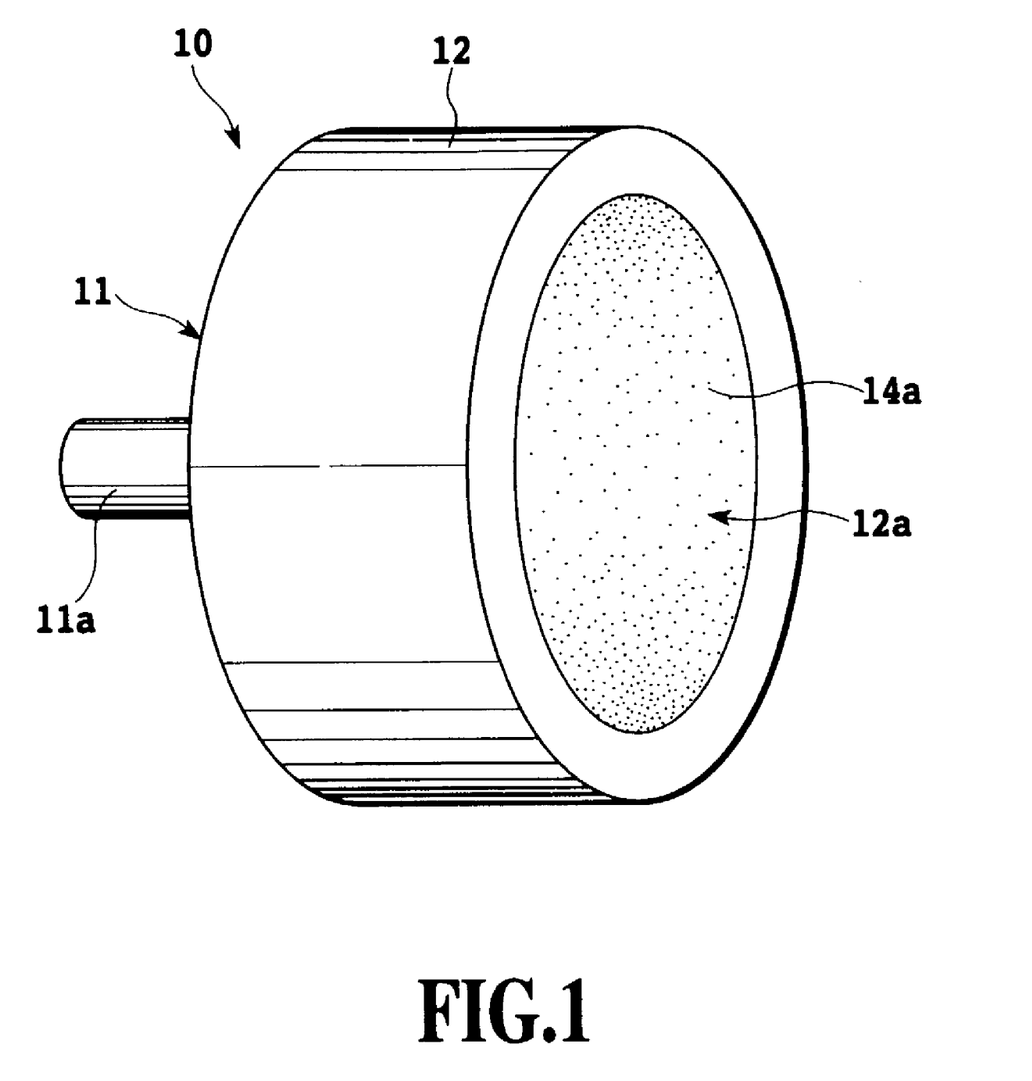
FIG. 1 is a perspective view for schematically illustrating the appearance of one embodiment of a centrifugal casting die according to the present invention.
Figure 2:
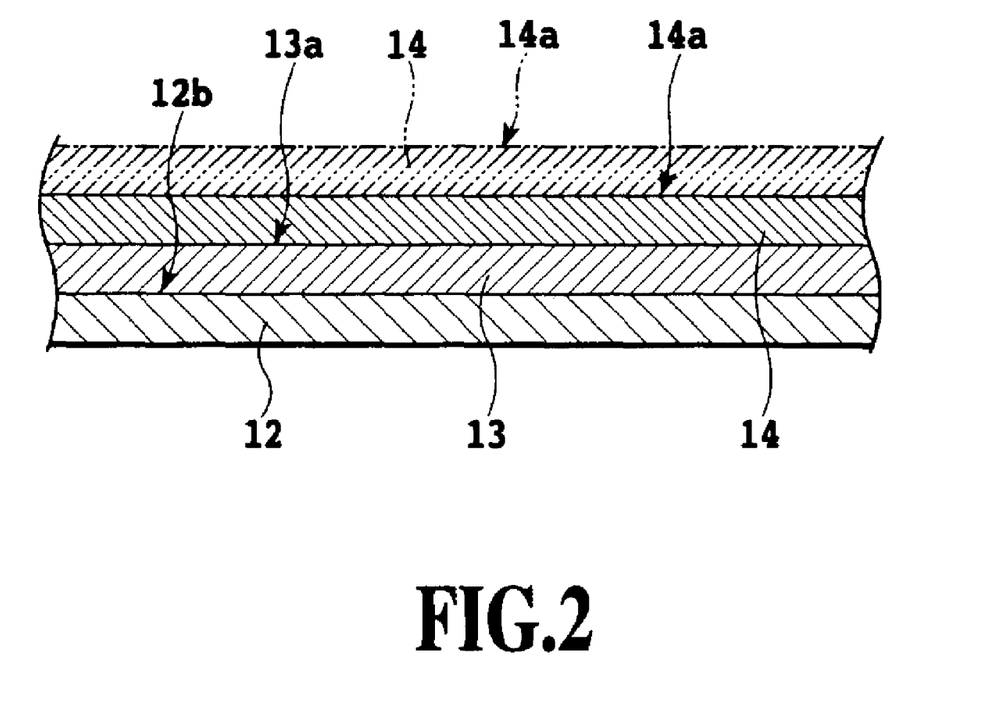
FIG. 2 is a sectional view of a cylindrical portion of the centrifugal casting die shown in FIG. 1.

The appearance of a centrifugal casting die according to one embodiment of the present invention is schematically shown in FIG. 1, and a sectional view of a main portion thereof is shown in FIG. 2 in an enlarged manner. That is, a die body 11 in this embodiment is of a conventionally used cylindrical cup-type, having a cylindrical portion 12 with an opening 12a at one end and a rotary shaft 11a projected outward to be coupled to a drive source (not shown) at the other end. On the inner surface 12b of the cylindrical portion 12 of the die body 11, a backup layer 13 of thermosetting resin is bonded in a releasable manner, while on the inner surface 13a of the backup layer 13, a top layer 14 of silicone rubber for holding a centrifugally casting material in a releasable maimer is bonded to be integral therewith. In other words, the inner surface 14a of the top layer 14 defines a casting surface (molding surface) for the centrifugally casting material.

Such a centrifugal casting die 10 is manufactured as described below. A first liquid agent is supplied to the inner surface 12b of the rotating cylindrical portion 12 of the die body 11 and uniformly spread over the inner surface 12b of the cylindrical portion 12. While maintaining this state, the first liquid agent is cured to form a backup layer 13 bonded to the inner surface 12b of the cylindrical portion 12 in a releasable manner.

In this case, since the backup layer 13 is formed while rotating the die body 11, a larger centrifugal force is applied to a region of the inner surface 12b of the cylindrical portion 12 having a larger eccentricity relative to a rotation center of the rotary shaft 11a of the die body 11, whereby a larger amount of first liquid agent flows thereinto. On the contrary, a smaller centrifugal force is applied to a region of the inner surface 12b having a smaller eccentricity, whereby a smaller amount of the first liquid agent flows thereinto. Thus, a thickness of the backup layer 13 formed on the inner surface 12b of the cylindrical portion 12 is larger in the region having the larger eccentricity and smaller in the region having the smaller eccentricity. As a result, the eccentricity of the inner surface 13a of the backup layer 13 is more mitigated relative to the rotation center of the rotary shaft 11a of the die body 11.

Then, while rotating the die body 11, a second liquid agent is supplied to the inner surface 13a of the backup layer 13 and uniformly spread over the entirety of the inner surface. In this state, the second liquid agent is cured to form a top layer 14 on the inner surface 13a of the backup layer 13 bonded to be integral therewith.

In a similar manner as in the backup layer 13 described before, since the eccentricity of the inner surface 14a of the top layer 14 relative to a rotation center of the rotary shaft 11a of the die body 11 is almost eliminated by forming the top layer 14 while rotating the die body 11, it is possible to approximately equalize the thickness in the circumferential direction of the centrifugally casting material formed by using the inner surface 14a of the top layer 14.

When the centrifugally casting material is produced by using the obtained centrifugal casting die 10, the releasability of the centrifugally casting material formed on the inner surface 14a of the top layer 14 is gradually deteriorated due to the repetition of casting operation. To recover this deterioration, it is effective to coat a fresh top layer 14 on the old top layer 14 having the deteriorated releasability. Thus, it is possible to prolong a life of the die 10 for the centrifugal casting by sequentially piling the top layers 14 in a similar manner as the formation of the top layer 14 on the inner surface 13a of the holding surface 13. In this case, since a diameter of the die becomes smaller as the thickness of the top layers 14 is larger, it is preferable to suitably adjust a weight of the centrifugally casting material to be supplied.

Further, when a thickness of the top layers 14 thus piled to be integral with each other reaches a certain value, the top layers 14 are removed from the cylindrical portion 12 together with the backup layer 13, and thereafter, a fresh backup layer 13 and a fresh top layer 14 are formed in accordance with the above-mentioned steps. Thus, it is possible to semipermanently reuse the die body 11.

Table 1 shows the comparison of the dies 10 for the centrifugal casting according to the present invention with dies other than those of the present invention when the cleaning blade of the electrophotographic apparatus is produced. The comparison has been made as to various properties, i.e., the maximum value of the eccentricity of the inner surface of the thickness of the centrifugally casting material, the surface roughness of the casting surface and the air surface of the centrifugally casting material, the releasability of the backup layer 13 and the top layer 14 relative to the cylindrical portion 12 of the die body 11, and the quality of image produced by the electrophotographic apparatus.

In this regard, the eccentricity of the inner surface of the centrifugally casting material was obtained as the largest one in the difference between the maximum and minimum values in the circumferential direction measured by a dial gauge of $1/100$ mm precision at five portions in the depth direction while rotating the centrifugal casting die at 20 rpm.

The thickness of the centrifugally casting material was measured by a dial gauge of $1/100$ mm precision at five portions in the depth direction, in each of which portion, 20 points were selected in the circumferential direction. The thickness variation was determined as the difference between the maximum and minimum values thereof.

The surface roughness of the casting surface and the air surface of the centrifugally casting material was measured by using a surface-roughness measuring device SE 3500 provided by Kosaka Laboratory Ltd. at a feed speed to the centrifugally casting material. Ten points were measured and averaged to be Rz.

The releasability of the backup layer 13 and the top layer 14 relative to the inner surface 12b of the cylindrical portion 12 was estimated by whether the actual releasability of the backup layer 13 and the top layer 14 relative to the inner surface 12b of the cylindrical portion 12 of the die body 11 was good or no good.

First, a die body 11 was prepared, having a diameter in the opening 12a of 1050 mm, a depth in the cylindrical portion 12 of 550 mm and the eccentricity in the inner surface 12b of the cylindrical portion 12 of 0.09 mm relative to the die body 11 at a normal temperature, and rotated at 800 rpm while being heated to 140° C. Under the conditions, a predetermined amount of epoxy resin was supplied to the inner surface 12b of the cylindrical portion 12 as a first liquid agent of the present invention, spread over the entirety of the inner surface 12b and heated and cured for 10 minutes to form a holding surface 13 of 1 mm thick on the inner surface 12b of the cylindrical portion 12.

Subsequently to the formation of this backup layer 13, while the die heated at 140° C. was rotated at 800 rpm, silicone rubber of a two-pack mixture type (provided by Dow Corning Toray Silicone Co., Ltd.) was supplied to the inner surface 13a of the holding surface 13a as a second liquid agent of the present invention and spread over the entirety of the inner surface 13a, which was then heated and cured for 60 minutes to be a top layer 14 of 1 mm thick formed on the inner surface 13a of the holding surface 13. Thus, a die 10 for the centrifugal casting (hereinafter conveniently referred to as an inventive die I) was produced.

A second centrifugal casting die was prepared by forming another top layer 14 of 1 mm thick in the same way as forming the preceding top layer 14 on the inner surface 14a of the top layer 14 in the inventive die I thus manufactured. Thus, a second centrifugal casting die (hereinafter conveniently referred to as an inventive die II) was obtained. Accordingly, the thickness of the top layer 14 formed in the inventive die II was 2 mm in total.

Figure 3:
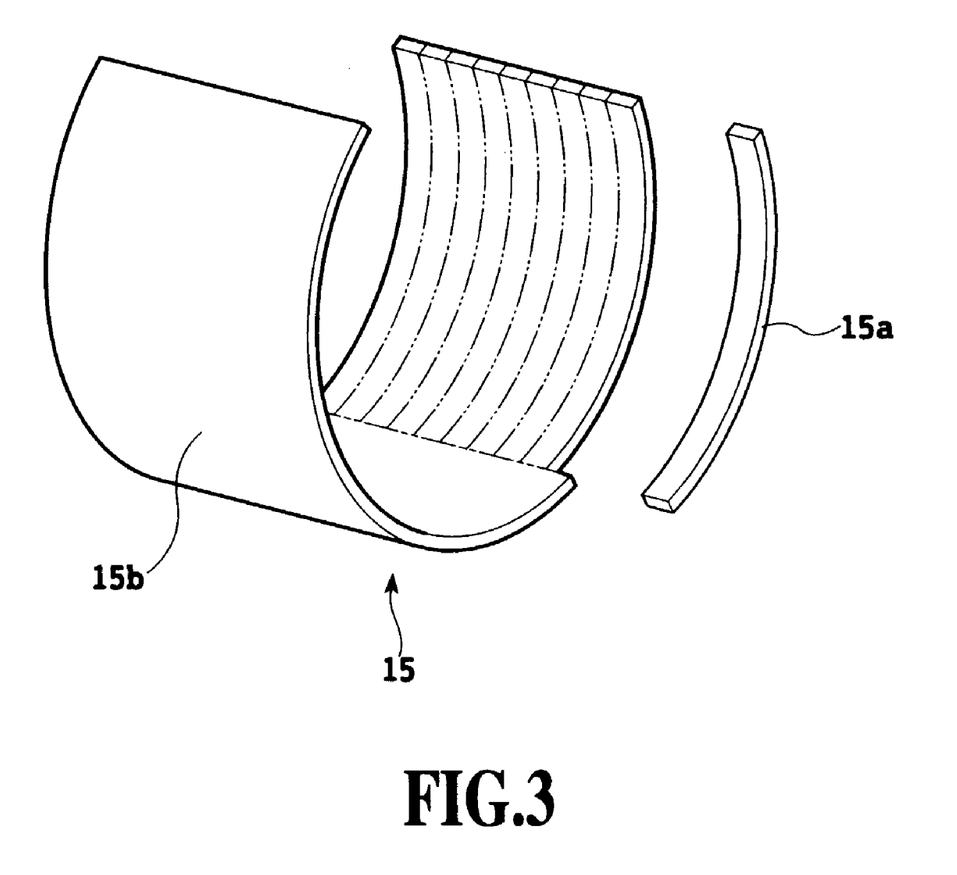
FIG. 3 is a schematic perspective view of the centrifugally casting material obtained by using the centrifugal casting die shown in FIG. 1.
Figure 4:
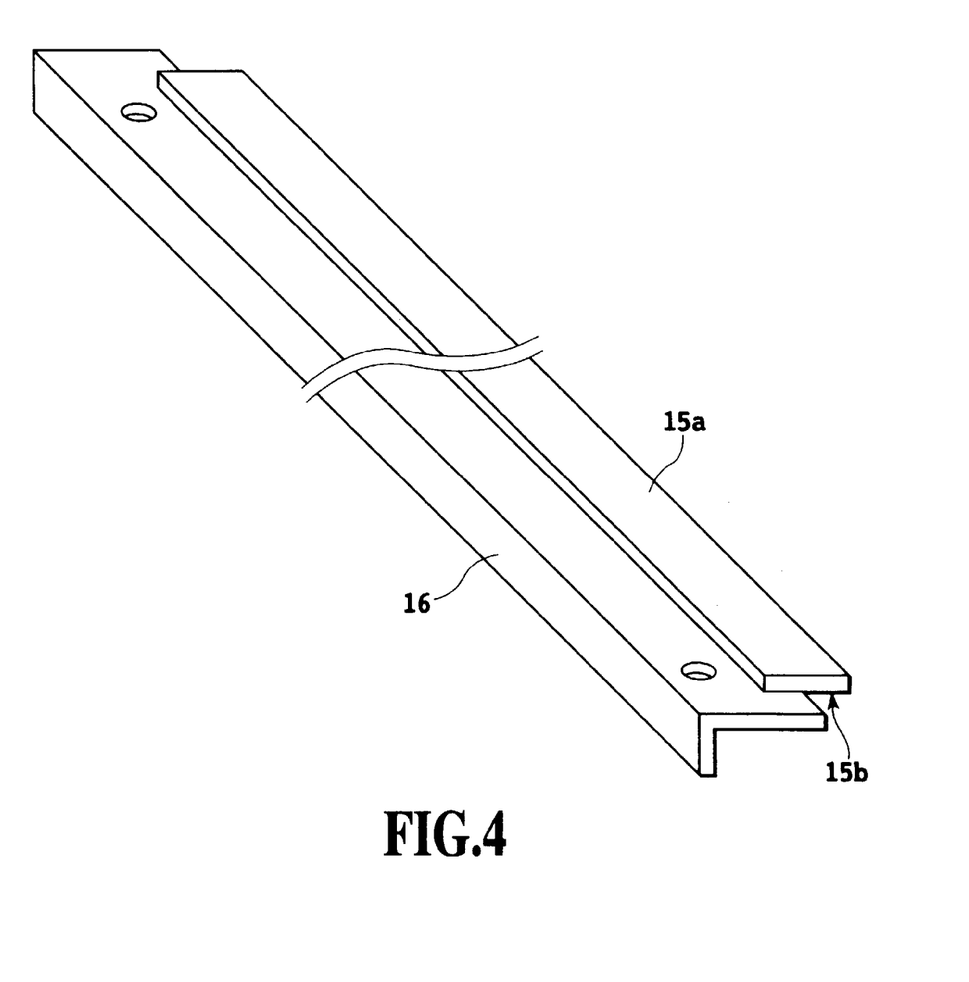
FIG. 4 is a broken perspective view of part of a cleaning blade in an electrophotographic apparatus.

To produce the cleaning blade of the electrophotographic apparatus, urethane prepolymer consisting of a copolymer (PEBA) of ethylene adipate and butylene adipate and a curing agent (1, 4-BD: TMP=60:40) both provided by Nippon Polyurethane Industry Co., Ltd. were mixed so that OH equivalent/NCO equivalent=0.9, which was supplied at a predetermined amount to the inner surface 14a of the top layer 14 of each of the inventive dies I and II heated at 140° C. and rotated at 800 rpm. Thus the mixture was spread over the entirety of the inner surface 14a and heated and cured for 40 minutes. After the inventive dies I and II were made to stop, the centrifugally casting materials of 2 mm thick were released from the top layers 14 to be removed from the inventive dies I, II, and secondarily cured at 130° C. for 4 hours to result in a cylindrical blade material 15 shown in FIG. 3, which is used to form cleaning blades 15a by cutting this blade material 15 into rectangular pieces in the circumferential direction as shown by a two-dot chain line in FIG. 3. The blade material 15 was bonded at the casting surface 15b thereof to a mounting member 16 of an L-shaped cross-sectional chromated steel plate 16 via a hot melt type adhesive. The mounting member 16 thus obtained was incorporated in a laser printer (Laser Shot LBP-850) provided by Canon Inc., and the quality of an image resulted from this layer printer was tested. Concretely, it was determined whether or not there is smearing due to a toner.

In comparison with these inventive dies I and II, a centrifugal casting die having no backup layer 13 and top layer 14 (hereinafter conveniently referred to as a comparative die I) and another centrifugal casting die solely having a top layer 14 of silicone rubber on the inner surface 12a of the cylindrical portion 12 (hereinafter conveniently referred to as a comparative die II) were prepared. By using the comparative die I, the above-mentioned centrifugally casting material was formed while coating a silicone type oil-like die-lubricant on the inner surface thereof, and the quality of an image obtained by a laser printer was estimated in the same manner as before. A top layer of a silicone rubber formed on the inner surface of the cylindrical portion of the comparative die II which is the same as that shown in FIG. 8 was obtained by the heat curing for 60 minutes.

TABLE 1

| | Eccentricity (mm) | Thickness variation (mm) | Surface roughness Rz (μm) | | Releasability | Image quality |
|---|---|---|---|---|---|---|
| | | | Cast surface | Air surface | | |
| Inventive die I | 0.01 | 0.02 | 0.2 | 0.1 | good | good |

TABLE 1-continued

|  | Eccentricity (mm) | Thickness variation (mm) | Surface roughness Rz (μm) | | Releasability | Image quality |
| --- | --- | --- | --- | --- | --- | --- |
|  |  |  | Cast surface | Air surface |  |  |
| Inventive die II | 0.02 | 0.03 | 0.2 | 0.1 | good | good |
| Comparative die I | 0.09 | 0.07 | 5.6 | 0.3 | — | not good |
| Comparative die II | 0.01 | 0.02 | 0.2 | 0.1 | not good | good |

As apparent from Table 1, the inventive dies I and II were small in the eccentricity of the inner surface 14a of the top layer 14, and the centrifugally casting materials were small in the thickness variation and good in the surface roughness both of the inner and outer surfaces thereof. When the centrifugally casting material was released from the inventive dies I and II, the floating or the ply separation was not recognized between both the top layers in the inventive dies II. Also, when the top layer 14 was removed from the cylindrical portion 12, it was easily releasable together with the backup layer 13. Further, the cleaning blade 15a obtained from the centrifugally casting material produced thereby was incorporated in the laser printer, and it was recognized that the image obtained from this laser printer is good in quality because a toner remaining on the outer surface of the photosensitive drum was completely cleaned without pass-through since the surface roughness of the casting surface 15b of the cleaning blade 15a is small.

Contrarily, since the eccentricity of the inner surface was large in the comparative die II, the thickness variation was also large in the resultant centrifugally casting material. Also, since no top layer 14 and the backup layer 13 were not formed on the inner surface 12b of the cylindrical portion 12 in the die body 11 and the surface roughness of the casting surface of the resultant centrifugally casting material was directly effected from that of the inner surface 12b of the cylindrical portion 12, the surface roughness of the casting surface of the resultant centrifugally casting material became significantly large. Accordingly, when the cleaning blade 15a manufactured from the centrifugally casting material obtained thereby is incorporated in the laser printer and an image was formed by this laser printer, a toner remaining on the outer surface of the photosensitive drum passed through the cleaning blade to contaminate the image.

In the comparative die II, since the eccentricity of the inner surface thereof was small due to the existence of the top layer 14, the resultant centrifugally casting material was similar to that obtained by the inventive die I. However, since there is no backup layer 13 between the inner surface 12b of the cylindrical portion 12 and the top layer 14, it was very difficult to release the top layer 14.

To improve the tackiness of the casting surface, it is effective to roughen the inner surface 14a of the top layer 14 in the above-mentioned embodiment.

Figure 5:
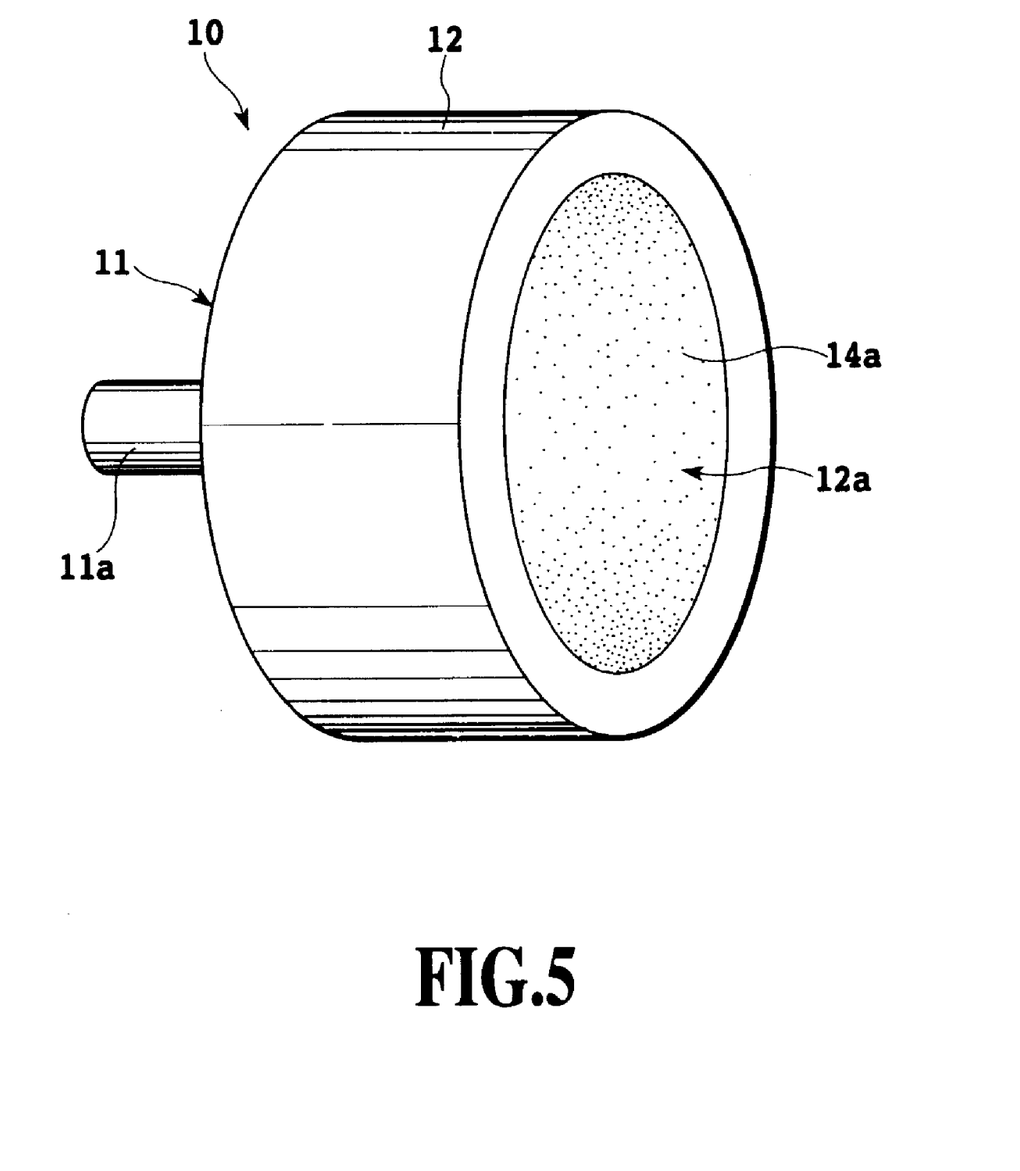
FIG. 5 is a perspective view for schematically illustrating the appearance of another embodiment of a centrifugal casting die according to the present invention.
Figure 6:
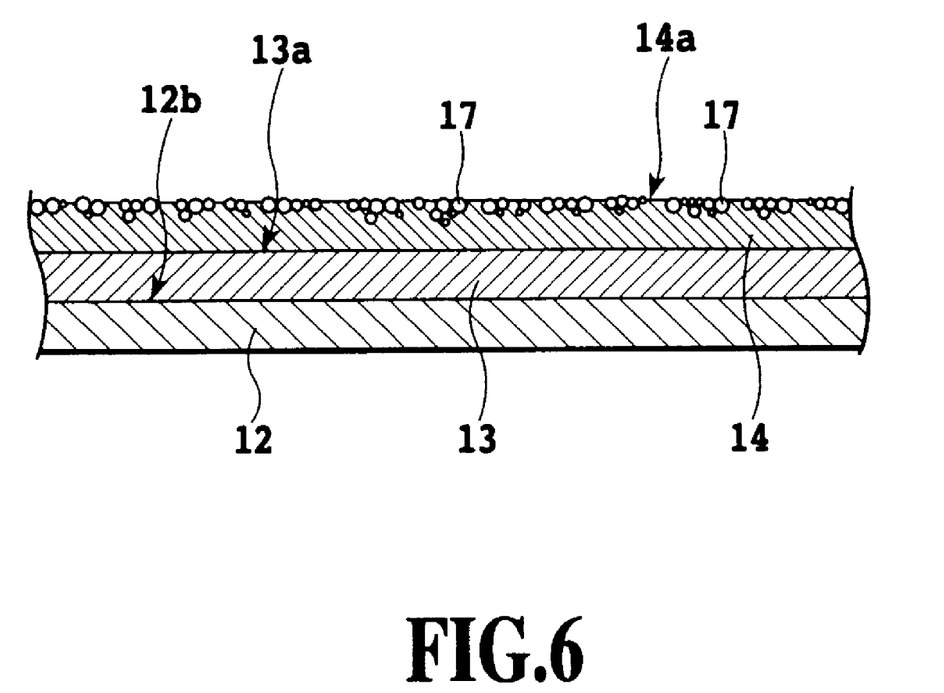
FIG. 6 is a sectional view of a cylindrical portion of the centrifugal casting die shown in FIG. 5.

The appearance of a centrifugal casting die according to another embodiment of the present invention is schematically shown in FIG. 5, and the sectional structure of a main part thereof is shown in an enlarged manner in FIG. 6. That is, in the same way as the preceding embodiment, a die body 11 in this embodiment is of a conventionally used cylindrical cup-type, having a cylindrical portion 12 with an opening 12a at one end and a rotary shaft 11a projected outward to be coupled to a drive source (not shown) at the other end. On the inner surface 12b of the cylindrical portion 12 of the die body 11, a backup layer 13 of thermosetting resin is bonded in a releasable manner, while on the inner surface 13a of the backup layer 13, a top layer 14 of silicone rubber for holding a centrifugally casting material in a releasable manner is bonded to be integral therewith. In other words, the inner surface 14a of the top layer 14 defines a casting surface (molding surface) for the centrifugally casting material. On the inner surface 14a of this top layer 14, that is, in a surface layer, a solid lubricant 17 for roughening the inner surface 14a is embedded, whereby the inner surface 14a of the top layer 14 is not a mirror surface but has a surface roughness Rz represented by an average value of 10 points in a range from approximately 2 to 10 μm. That is, if the ten-point average surface roughness is less than 2 μm, the tackiness is not so effectively reduced, while if exceeding 10 μm, it is necessary to use a considerable amount of expensive solid lubricant to increase the manufacturing cost.

Such a centrifugal casting die 10 is manufactured as described below. A first liquid agent is supplied to the inner surface 12b of the rotating cylindrical portion 12 of the die body 11 and uniformly spread over the inner surface 12b of the cylindrical portion 12. While maintaining this state, the first liquid agent is cured to form a backup layer 13 bonded to the inner surface 12b of the cylindrical portion 12 in a releasable manner.

In this case, since the backup layer 13 is formed while rotating the die body 11, a larger centrifugal force is applied to a region of the inner surface 12b of the cylindrical portion 12 having a larger eccentricity relative to a rotation center of the rotary shaft 11a of the die body 11, whereby a larger amount of first liquid agent flows thereinto. On the contrary, a smaller centrifugal force is applied to a region of the inner surface 12b having a smaller eccentricity, whereby a smaller amount of the first liquid agent flows thereinto. Thus, a thickness of the backup layer 13 formed on the inner surface 12b of the cylindrical portion 12 is larger in the region having the larger eccentricity and smaller in the region having the smaller eccentricity. As a result, the eccentricity of the inner surface 13a of the backup layer 13 is more mitigated relative to the rotation center of the rotary shaft 11a of the die body 11.

Then, while rotating the die body 11, a second liquid agent is supplied to the inner surface 13a of the backup layer 13 formed on the die body 11 and spread over the entirety of the inner surface 13a. The second liquid agent is cured in this state. Before the second liquid agent has been completely cured, a second liquid containing the surface-roughening agent is further sprayed on the inner surface thereof, and continuously heated to complete the curing the same, whereby it is bonded to be integral with the inner surface 13a of the backup layer 13 to form the roughened surface 14a of the top layer 14.

The above-mentioned surface-roughening agent is used for intentionally forming the irregularity on the inner surface 14a of the die 10 for the centrifugal casting. Particularly, by adopting the solid lubricant 17 as a surface-roughening agent, when the centrifugally casting material is released from the die 10 for the centrifugal casting, it is released while part thereof is adhered to the casting surface of the centrifugally casting material so that the casting surface of the centrifugally casting material has a satin pattern to reduce the tackiness thereof.

In a similar manner as in the backup layer 13 described before, since the eccentricity of the inner surface 14a of the top layer 14 relative to a rotation center of the rotary shaft 11a of the die body 11 is almost eliminated by forming the top layer 14 while rotating the die body 11, it is possible to approximately equalize the thickness in the circumferential direction of the centrifugally casting material formed by using the inner surface 14a of the top layer 14. In addition, according to this embodiment, since the inner surface 14a of the top layer is roughened by the solid lubricant 17, it is possible to avoid the inconvenience that the cleaning blade is tacked to a casting jig or the like when the cleaning blade of the electrophotographic apparatus is produced, whereby the workability is improved.

When the centrifugally casting material is produced by using the obtained centrifugal casting die 10, the releasability of the centrifugally casting material formed on the inner surface 14a of the top layer 14 is gradually deteriorated due to the repetition of casting operation. To recover this deterioration, it is effective to coat a fresh top layer 14 on the old top layer 14 having the deteriorated releasability. Thus, it is possible to prolong a life of the die 10 for the centrifugal casting by sequentially piling the top layers 14 in a similar manner as the formation of the top layer 14 on the inner surface 13a of the holding surface 13.

Further, when a thickness of the top layers 14 thus piled to be integral with each other reaches a certain value, the top layers 14 are removed from the cylindrical portion 12 together with the backup layer 13, and thereafter, a fresh backup layer 13 and a fresh top layer 14 are formed in accordance with the above-mentioned steps. Thus, it is possible to semipermanently reuse the die body 11.

Table 2 shows the comparison of the dies 10 for the centrifugal casting according to the present invention with dies other than those of the present invention when the cleaning blade of the electrophotographic apparatus is produced. The comparison has been made as to various properties, i.e., the maximum value of the eccentricity of the inner surface of the centrifugal casting die, the maximum value of the thickness of the centrifugally casting material, the surface roughness of the casting surface and the air surface of the centrifugally casting material, the releasability of the backup layer 13 and the top layer 14 relative to the cylindrical portion 12 of the die body 11, and the quality of image produced by the electrophotographic apparatus.

The measurement and the estimation are basically the same as in the preceding embodiment. Quality of of the tackiness of the casting surface of the centrifugally casting material was determined by determining whether or not the casting surface of the cleaning surface is adhered to the casting.

A size and a shape of the die body 11 and the treatment until the backup layer 13 has been formed on the inner surface 12b of the cylindrical portion 12 thereof are the same as in the preceding embodiment. Subsequently to the formation of the backup layer 13, while the die heated at 140° C. was rotating at 800 rpm, a predetermined amount of silicone rubber of a two-pack mixture type (provided by Dow Corning Toray Silicone Co., Ltd.) was supplied as a second liquid agent to the inner surface 13a of the backup layer 13 and spread over the entirety of the inner surface 13a, after which it was heated for 10 minutes. Before this silicone rubber of a two-pack mixture type has been completely cured, a uniform mixture of graphite fluoride (provided by Central Glass Co., Ltd.), the above-mentioned silicone rubber of a two-pack mixture type and toluene as a solvent mixed at a ratio of 1:2:3 by weight was sprayed for 20 seconds. While maintaining this state, the curing was continued for 60 minutes to form the top layer 14 of 1 mm thick on the inner surface 13a of the backup layer 13 to obtain the die 10 for the centrifugal casting (hereinafter conveniently referred to an inventive die III).

In this regard, a thickness of the surface layer of the top layer 14 containing graphite fluoride formed by the spraying of the mixture is less than 0.01 mm.

A further top layer 14 of 1 mm thick was formed on the inner surface 14a of the top layer 14 in the inventive die III in the same way as in the preceding top layer 14, whereby a second centrifugal casting die (hereinafter conveniently referred to as an inventive die IV) was obtained.

A cleaning blade for the electrophotographic apparatus was produced from the same material and step as in the preceding embodiment.

In comparison with these inventive dies III and IV, a centrifugal casting die including a die body 11 having no backup layer 13 and top layer 14 on the inner surface 12b of the cylindrical portion 12 (hereinafter conveniently referred to as a comparative die III) and another centrifugal casting die solely having a top layer 14 of silicone rubber on the inner surface 12a of the cylindrical portion 12 (hereinafter conveniently referred to as a comparative die IV) were prepared. By using these dies, the above-mentioned centrifugally casting materials were formed, while coating a silicone type oil-like die-lubricant on the inner surface thereof in a case of the comparative die III, from which the cleaning blades for the electrophotographic apparatus were prepared. In this regard, the top layer 14 formed on the inner surface 12b of the cylindrical portion 12 in the comparative die IV was formed by uniformly spreading silicone rubber of a two-pack mixture type over the entirety of the inner surface of the cylindrical portion and cured for 60 minutes.

TABLE 2

| | Eccentricity (mm) | Thickness variation (mm) | Surface roughness Rz (μm) | | Tackiness of casting surface | Releas- ability |
|---|---|---|---|---|---|---|
| | | | Cast surface | Air surface | | |
| Inventive die III | 0.01 | 0.02 | 5.8 | 0.1 | good | good |
| Inventive die IV | 0.01 | 0.02 | 7.3 | 0.1 | good | good |
| Comparative die III | 0.07 | 0.06 | 8.5 | 0.3 | good | — |
| Comparative die IV | 0.01 | 0.02 | 0.2 | 0.1 | not good | not good |

As apparent from Table 2, the inventive dies III and IV were small in the eccentricity of the inner surface 14a of the top layer 14, and the centrifugally casting materials were small in the thickness variation and good in the surface roughness of the inner surface thereof. Since the outer surface of this centrifugally casting material has a satin pattern, this surface is low in tackiness and free from the inconvenience that the cleaning blade 16a made therefrom is liable to stick to the casting jig or others. Also, when the centrifugally casting material is released from the inventive dies III and IV, the floating or ply separation between two top layers 14 was not recognized in the inventive die IV. Further, when the inventive dies III, IV were cooled for the purpose of removing the top layer 14 from the cylindrical portion 12, the backup layer 13 is liable to float from the inner surface of the cylindrical portion, whereby the backup layer 13 was easily removed from the inner surface of the cylindrical portion together with the top layer 14.

Contrarily, since the eccentricity of the inner surface was large in the comparative die III, the thickness variation was also large in the resultant centrifugally casting material.

In the comparative die IV, since the eccentricity of the inner surface thereof is small due to the existence of the top layer 14, the thickness of the resultant centrifugally casting material was similar to that of the inventive die III. However, since there was no backup layer 13 between the inner surface 12b of the cylindrical portion 12 and the top layer 14, it was difficult to release the top layer 14 from the die. Also, since the casting surface of the centrifugally casting material was in a mirror surface state, this casting surface was high in tackiness, resulting in the inconvenience in that the cleaning blade made therefrom is liable to unfavorably stick to a handling jig or others.

In this regard, as a result of testing the quality of images formed by the electrophotographic apparatuses incorporating cleaning blades obtained from these dies, it was recognized that in the inventive dies III, IV and the comparative die IV, no toner remaining on the outer surface of the photosensitive drum has passed through the cleaning blade to result in a good image, and on the contrary, the toner remaining on the outer surface of the photosensitive drum has slightly passed through the cleaning blade since the cleaning blade is large in thickness variation to result in a dirty image.

The present invention has been described in detail with respect to preferred embodiments, and it will now be apparent from the foregoing to those skilled in the art that changes and modifications may be made without departing from the invention in its broader aspects, and it is the intention, therefore, that the appended claims cover all such changes and modifications as fall within the true spirit of the invention.

What is claimed is:

1. A method for manufacturing a centrifugal casting die comprising the steps of:
   supplying a first liquid agent for forming a backup layer to be releasably bonded to an inner surface of a cylindrical die with a die body;
   rotating the die body so that the first liquid agent is uniformly spread over the entirety of the inner surface of the die body;
   curing the first liquid agent spread over the entirety of the inner surface of the die body to form the backup layer, the backup layer being formed of a thermosetting resin, which does not exhibit a rubber-like elasticity in a temperature range from room temperature to 150° C. and which has a heat-resistant temperature equal to a curable temperature or higher;
   supplying a second liquid agent for forming a top layer to be bonded with an inner surface of the backup layer;
   rotating the die body so that the second liquid agent is uniformly spread over the entirety of the inner surface of the backup layer;
   curing the second liquid agent spread over the entirety of the inner surface of the backup layer to form the top layer, the top layer holding a centrifugally cast material supplied to the inner surface thereof the centrifugally cast material being released from the inner surface of the top layer; and
   forming piled top layers by forming at least one fresh top layer on the inner surface of an existing top layer after repeating the step of releasing the centrifugally cast material from the inner surface of the fresh top layer,
   wherein the step of supplying a second liquid agent and forming the top layer comprises the step of further spraying a liquid containing a surface-roughing agent on the inner surface of the top layer which is still uncured at the time and before the second liquid agent spread over the entirety of the inner surface of the backup layer has completely cured to roughen the inner surface of the top layer, to easily release the cured cylindrical centrifugally cast material from the inner surface of the top layer.

2. The method for manufacturing the centrifugal casting die according to claim 1, wherein the surface-roughing agent includes a solid lubricant having a particle size of 10 μm or less and a resistance to heat of 150° C.

3. The method for manufacturing the centrifugal casting die according to claim 1, further comprising the steps of:

removing the backup layer from the cylindrical die together with the piled top layers when the thickness of the piled top layers reaches a certain value; and forming a fresh backup layer and a fresh top layer on the inner surface of the die body from which the old backup layer has been removed together with the piled top layers.

4. The method for manufacturing the centrifugal casting die according to claim 3, wherein the step of removing the backup layer from the cylindrical die together with the piled top layers includes the step of cooling the die body to release the backup layer from the die body together with the piled top layers by using the difference in coefficient of thermal expansion between the die body and the backup layer.

5. A method for manufacturing a blade for an electrophotographic apparatus, comprising the steps of:

providing a centrifugal casting die manufactured by a method comprising the steps of:

supplying a first liquid agent for forming a backup layer to be releasably bonded to an inner surface of a cylindrical die with a die body;

rotating the die body so that the first liquid agent is uniformly spread over the entirety of the inner surface of the die body;

curing the first liquid agent spread over the entirety of the inner surface of the die body to form the backup layer, the backup layer being formed of a thermosetting resin, which does not exhibit a rubber-like elasticity in a temperature range from room temperature to 150° C. and which has a heat-resistant temperature equal to a curable temperature or higher;

supplying a second liquid agent for forming a top layer to be bonded with an inner surface of the backup layer;

rotating the die body so that the second liquid agent is uniformly spread over the entirety of the inner surface of the backup layer;

curing the second liquid agent spread over the entirety of the inner surface of the backup layer to form the top layer, the top layer holding a centrifugally cast material supplied to the inner surface thereof, the centrifugally cast material being released from the inner surface of the top layer; and forming piled top layers by forming at least one fresh top layer on the inner surface of an existing top layer after repeating the step of releasing the centrifugally cast material from the inner surface of the top layer, wherein the step of supplying a second liquid agent and said step of forming the fresh top layer comprises a step of further spraying a liquid containing a surface-roughing agent on the inner surface of the fresh top layer which is still uncured at the time and before the second liquid agent spread over the entirety of the inner surface of the backup layer has completely cured to roughen the inner surface of the fresh top layer, to easily release the cured cylindrical centrifugally cast material from the inner surface of the fresh top layer;

supplying liquid material forming the blade for the electrophotographic apparatus to the inner surface of the top layer;

rotating the die body to uniformly spread the liquid material over the entirety of the inner surface of the top layer;

curing the liquid material spread over the entirety of the inner surface of the top layer to result in a cylindrical centrifugally cast material;

releasing the cured cylindrical centrifugally cast material from the die body; and cutting the cylindrical centrifugally cast material in the circumferential direction into rectangular pieces.

6. The method for manufacturing the blade for the electrophotographic apparatus according to claim 5, further comprising the step of holding the blade to a mounting member using an adhesive, wherein the blade is a cleaning blade to be brought into slide-contact with an outer surface of a photosensitive drum in the electrophotographic apparatus for wiping-off the outer surface of the photosensitive drum.

7. The method for manufacturing the blade for the electrophotographic apparatus according to claim 5, further comprising the step of holding the blade to a mounting member using an adhesive, wherein the blade is a developer blade to be brought into slide-contact with an outer surface of a developer sleeve in the electrophotographic apparatus for restricting an amount of toner carried on the developer sleeve.

8. The method for manufacturing a blade for an electrophotographic apparatus according to claim 5, further comprising the steps of:

removing the backup layer from the cylindrical die together with the piled top layers when the thickness of the piled top layers reaches a certain value; and forming a fresh backup layer and a fresh top layer on the inner surface of the die body from which the old backup layer has been removed together with the piled top layers.

9. A method for manufacturing a centrifugal casting die comprising the steps of:

supplying a first liquid agent for forming a backup layer to be releasably bonded to an inner surface of a cylindrical die with a die body;

rotating the die body so that the first liquid agent is uniformly spread over the entirety of the inner surface of the die body;

curing the first liquid agent spread over the entirety of the inner surface of the die body to form the backup layer;

supplying a second liquid agent to be bonded to be integral with an inner surface of the backup layer to form a top layer;

rotating the die body so that the second liquid agent is uniformly spread over the entirety of the inner surface of the backup layer;

curing the second liquid agent spread over the entirety of the inner surface of the backup layer to form the top layer;

centrifugally casting a material supplied to the inner surface of the top layer;

releasing the material from the inner surface of the top layer;

forming piled top layers by forming a fresh top layer on the top layer after repeating the step of releasing the centrifugally cast material from the inner surface of the top layer;

removing the backup layer from the cylindrical die together with the piled top layers when the thickness of the piled top layers reaches a certain value; and forming another fresh backup layer and a fresh top layer on the cylindrical die after removing the backup layer from the cylindrical die together with the piled top layers.

10. The method for manufacturing the centrifugal casting die according to claim 9, wherein the step of removing the backup layer from the cylindrical die together with the piled top layers includes the step of cooling the die body to release the backup layer from the die body together with the piled top layers by using the difference in coefficient of thermal expansion between the die body and the backup layer.

* * * * *